Sept. 18, 1923.
R. DOWNING
AUTOMOBILE GLARE SHIELD
Filed Sept. 6, 1922
1,468,197
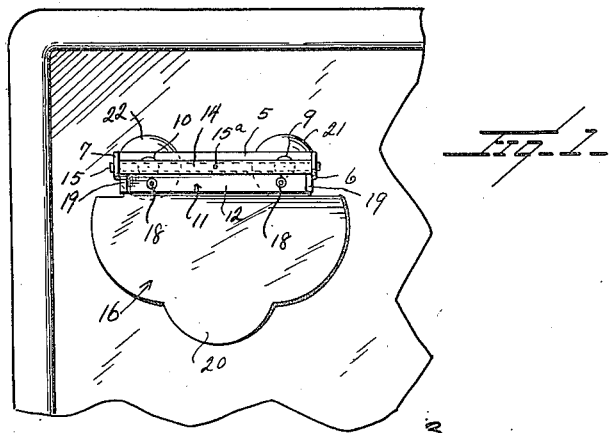
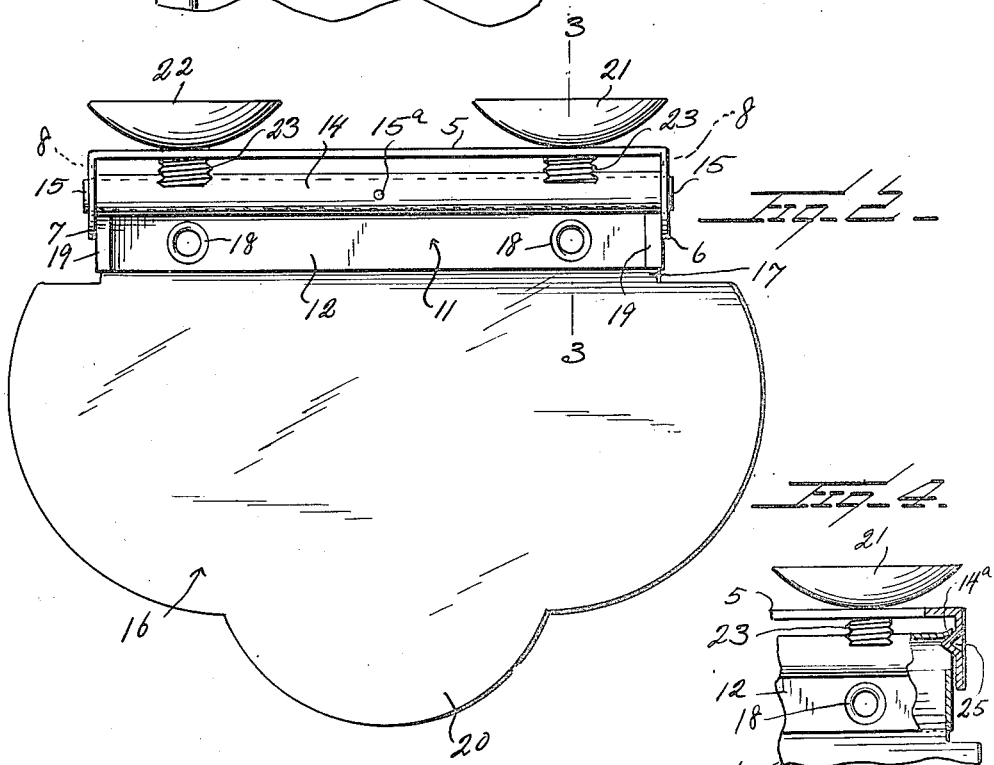
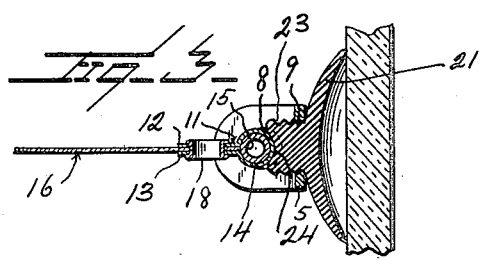
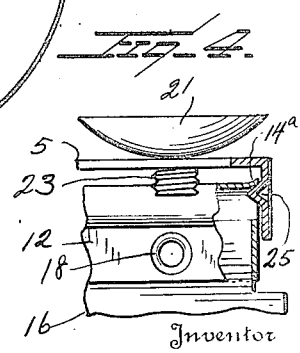
Inventor
R. Downing
By Watson E. Coleman
Attorney Patented Sept. 18, 1923.

1,468,197

UNITED STATES PATENT OFFICE.

ROSWELL DOWNING, OF OKLAHOMA, OKLAHOMA, ASSIGNOR TO DOWNEY GLARE SHIELD COMPANY, OF OKLAHOMA COUNTY, OKLAHOMA.

AUTOMOBILE GLARE SHIELD.

Application filed September 6, 1922. Serial No. 586,478.

*To all whom it may concern:*

Be it known that I, ROSWELL DOWNING, a citizen of the United States, residing at Oklahoma city, in the county of Oklahoma and State of Oklahoma, have invented certain new and useful Improvements in Automobile Glare Shields, of which the following is a specification, reference being had to the accompanying drawings.

This invention relates to automobile glare shields, and has for its object to provide a device of this character capable of being positioned at any point on the windshield to shield the eyes of the operator without obstructing the view.

It is another object of the invention to provide a shield of this character which may be removed or secured to the glass of the windshield and positioned at any point or angle to suit the operator.

It is a further object of the invention to provide a shield of this character of a size sufficient to shade the eyes of the operator without requiring the shield to be extended transversely of the car.

It is a still further object of the invention to provide a shield of this character which may be adjusted after being secured to the windshield so that when not necessary the shield may be moved on its support without removing the support from the windshield.

With these and other objects in view the invention consists in the improved construction and arrangement of parts to be hereinafter more particularly described, fully claimed and illustrated in the accompanying drawings, in which:—

Figure 1 is a fragmentary elevation of a windshield showing the invention applied;

Figure 2 is a plan view of the glare shield;

Figure 3 is a section taken on the line 3—3 of Figure 2; and

Figure 4 is a fragmentary plan and sectional view of another form of the invention.

Referring to the drawings, 5 designates a bracket consisting of a strip of material having its end portions extended at right angles to the strip and in spaced relation to each other to provide supporting ears 6 and 7, each ear having an opening 8. The body portion of the strip is provided with relatively large openings 9 and 10, the opening 9 being positioned adjacent the ear 6, while the opening 10 is positioned adjacent the ear 7. The purpose of these openings will be hereinafter described.

Disposed between the ears 6 and 7 of the bracket is a clamp 11, said clamp consisting of a sheet of material having one of its longitudinal edge portions reverted upon the opposite longitudinal edge portion to provide a pair of clamping jaws 12 and 13. The bight portion 14 of the clamp is formed substantially tubular to provide a casing for the reception of a shaft 15. The shaft extends longitudinally of the casing and has its ends disposed in the openings 8 of the ears 6 and 7. By this means the clamp 11 may oscillate on the bracket, so as to permit the same to be adjusted at various angles relative to the body portion of the bracket and thus permit the shield to obstruct the glare of the sun or the headlights of approaching automobiles, without obstructing the view of the driver. A rivet 15ª is passed through the central portion of the casing 14 and the shaft 15 to prevent movement of the shaft within the casing. A sheet of transparent material 16, such as celluloid, mica, etc. is provided, said sheet having the corners of its rear edge cut away so as to provide an extension 17 adapted to be disposed between the jaws 12 and 13 of the clamp. Fastening means 18 are passed through the jaws and the shield to secure the same to the clamp. The jaw 13 of the clamp is provided with fingers 19 which extend beyond the adjacent ends of the jaw 12 and are passed over said ends of the jaw 12 so as to entirely enclose the extensions 17 within the jaws thus preventing the shield from being torn from the fastening means 18. The forward portion of the shield is formed to provide an extension 20. The purpose of this is to render the shield as small as possible without destroying its function as a shield. The extension 20 provides a peak which greatly assists in destroying the glare, the portions of the shield adjacent the peak permitting the driver to see the road unobstructedly.

In order that the bracket 5 may be secured to the windshield, without requiring alteration of the windshield, or without requiring the formation of openings in the glass pane of the windshield, there is provided novel holding means in the form of vacuum cups 21 and 22. Each cup has a stem 23 projecting from the center of the convex face thereof, said stem similar to the cup being formed of pliable material, such as rubber. The stem is screw threaded, the threads being of such a size as to readily receive the edges of the opening in the bracket 5. The end face of the stem is also provided with a groove 24 of a size to receive and frictionally engage the casing or bight portion 14 of the clamp.

The cup 21 is threaded in the opening 9 of the bracket, while the cup 22 is threaded in the remaining opening 10 of the bracket. It is of course obvious that the thickness of the bracket is of such a character as to permit the threads to receive the edge of the opening without requiring the opening to be threaded. Each cup is threaded through the opening until the convex face of the cup comes in contact with the rear face of the bracket 5. This permits the stem to project a considerable distance inwardly of the bracket between the ears and causes the same to frictionally engage the casing 14. The advantage of this is that it permits the clamp and shield to be adjusted and held in their adjusted positions indefinitely without danger of the same slipping through vibration of the car, as the grooves 24 permit the end face of the stem to frictionally engage the casing 14, regardless of the angle at which the shield may be disposed. In addition to this, the stem serves to urge the ends of the shaft 15 in engagement with the openings in the ears so as to prevent unnecessary oscillating movement of the shield.

In Figure 4, another form of the invention is shown. This form consists in providing the ears 6 and 7 with bosses 25 which are struck from the ears and extended inwardly toward each other. These bosses serve as trunnions and are adapted to receive the end portions of the casing 14ª, the extremities of said end portions being flared as at 25 so as to frictionally engage the trunnions, the shaft 15 in this form of the invention being omitted.

In use, the vacuum cups are intended to be moistened so as to assure the adhesion thereof to the windshield. The cups are then pressed and secured by vacuum to the windshield a couple of inches to the left of the driver's direct view of the road and not directly in the driver's path of view. It is also positioned high enough so that the driver can easily see under the shield and in fact all around it. In view of the size of the vacuum cups the bracket will remain indefinitely in position and if the shield is not desired the driver may swing the same upwardly substantially parallel to the top of the car. However, as the device is not in the direct path of vision of the driver this is not necessary. When the glaring headlights of approaching automobiles or the direct rays of the sun strike the eyes of the driver it is only necessary for the driver to move the head a slight distance so as to come within the range of the shield, thus protecting his eyes from the glare without obstructing his view of the road.

From the foregoing it will be readily seen that this invention provides a novel form of glare shield which may be readily attached to the windshield of any automobile, as no special fastening means are necessary in view of the use of vacuum cups. In addition to this the vacuum cups are threaded in the bracket so that should either one of the cups become worn or damaged it may be readily removed and replaced by a new one, thus eliminating the necessity of discarding the entire shield. In addition to this the device is compact, simple and light in weight, so that it may be adjusted to any point or angle on the windshield to suit the purpose of the driver, without danger of the device being forced from the windshield by the vibratory movement of the car.

What is claimed is:—

1. A glare shield comprising a bracket having spaced supporting ears, a shield holding member movably supported by the ears, a shield secured to said member and movable therewith, and vacuum holding cups carried by the bracket remote from the shield holding member, a portion of said cups extending through the bracket and arranged to frictionally engage the shield holding member.

2. A glare shield comprising a bracket having spaced supporting ears, a shield holding member movably supported by the ears, a shield secured to said member and movable therewith, said bracket having spaced openings, vacuum cups, each having a threaded stem adapted to be threaded in one of the openings of the bracket, the end face of each stem having a recess adapted to receive a portion of the windshield holding member to frictionally engage and prevent accidental movement of said member.

In testimony whereof I hereunto affix my signature.

ROSWELL DOWNING.

Certificate of Correction.

It is hereby certified that the name of the assignee in Letters Patent No. 1,468,197, granted September 18, 1923, upon the application of Roswell Downing, of Oklahoma, Oklahoma, for an improvement in "Automobile Glare Shields," should have been written and printed as *Downing Glare Shield Company* instead of "Downey Glare Shield Company," as shown by the records of assignments in this office; and that the said Letters Patent should be read with this correction therein that the same may conform to the record of the case in the Patent Office.

Signed and sealed this 16th day of October, A. D., 1923.

[SEAL.]
WM. A. KINNAN,
*Acting Commissioner of Patents.*